May 20, 1952 L. McCOY 2,597,659
SCRAPER AND APRON ACTUATING MECHANISM
Filed Oct. 21, 1948 4 Sheets-Sheet 2
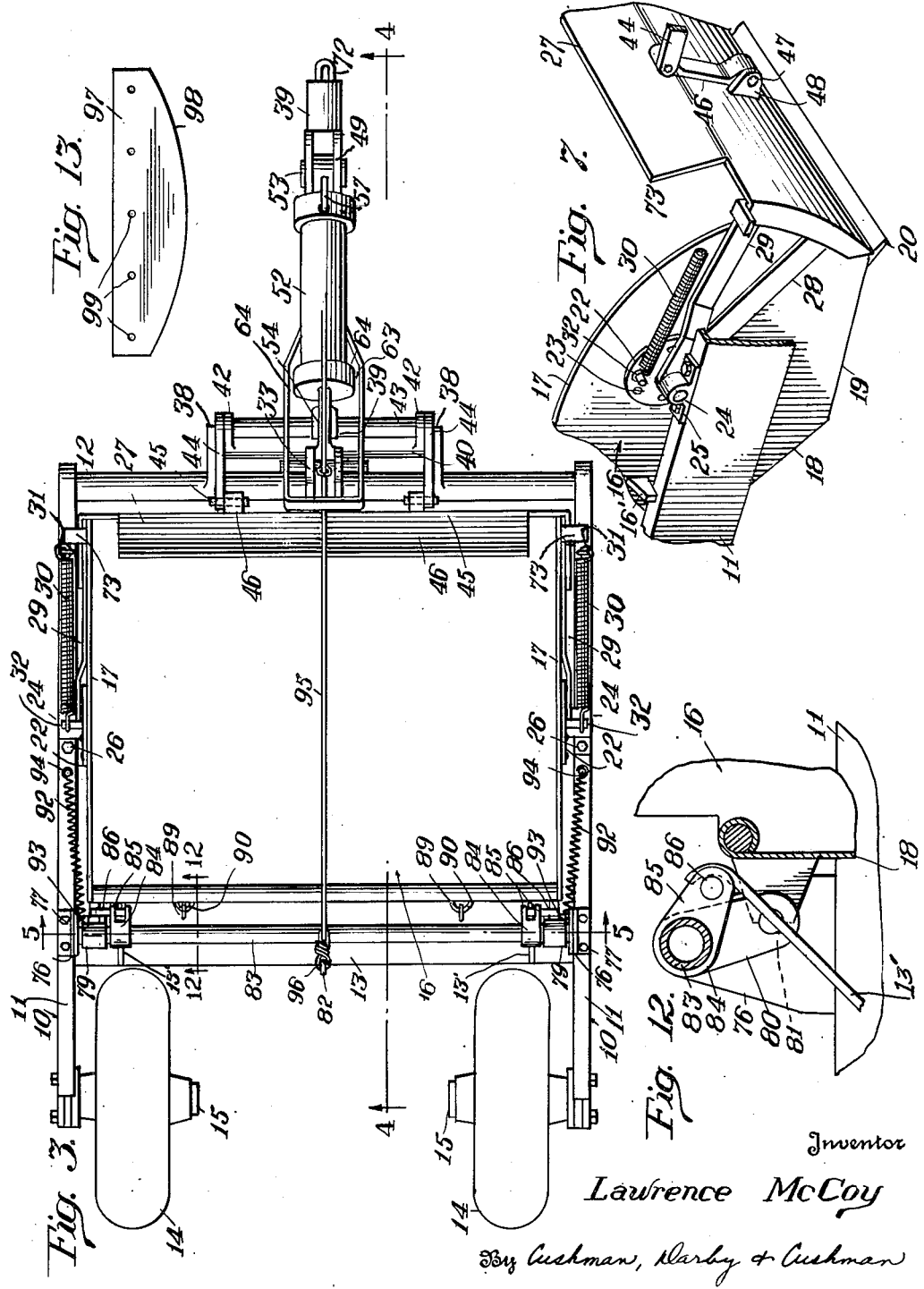
Inventor
Lawrence McCoy
By Cushman, Darby & Cushman
Attorneys

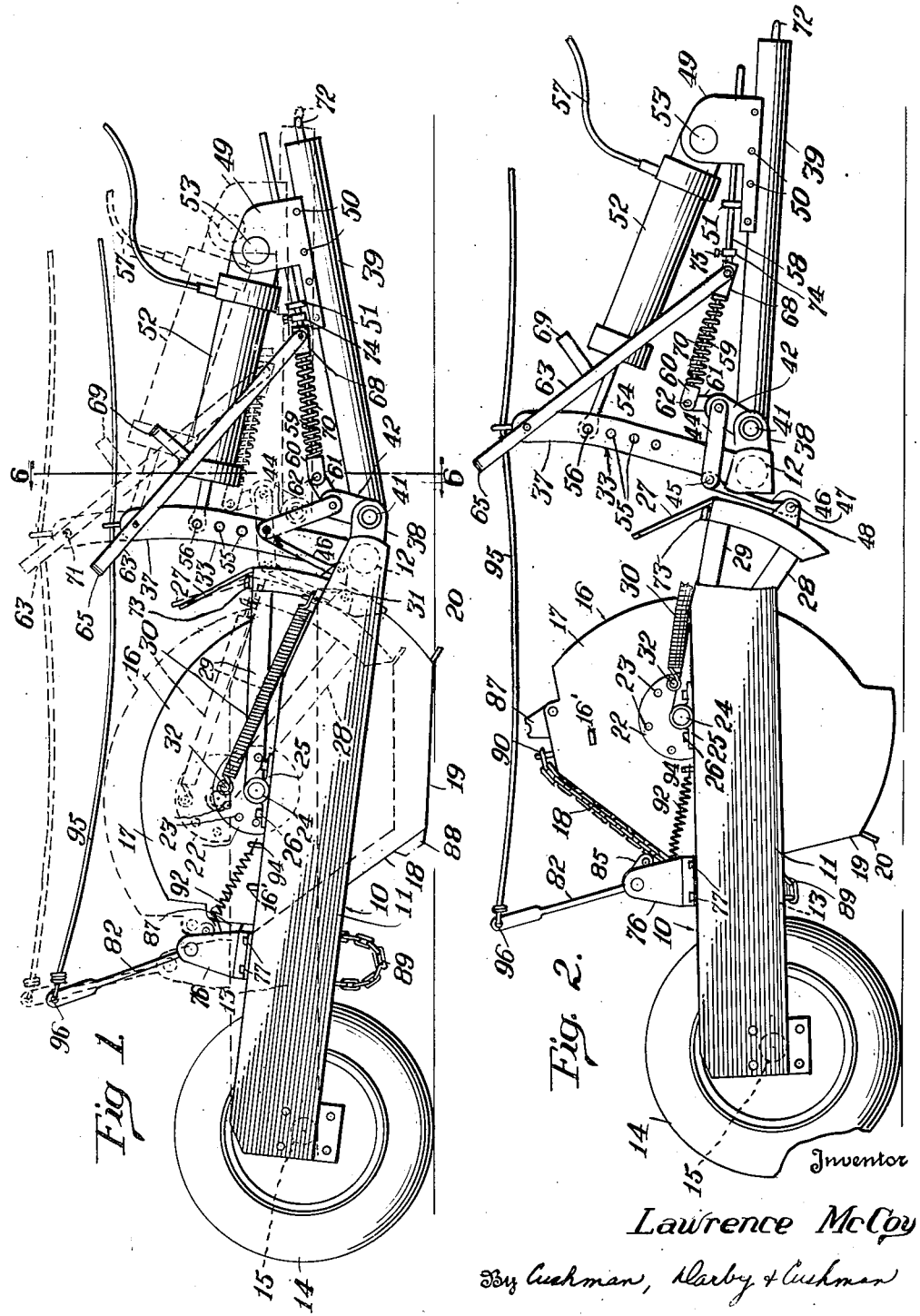

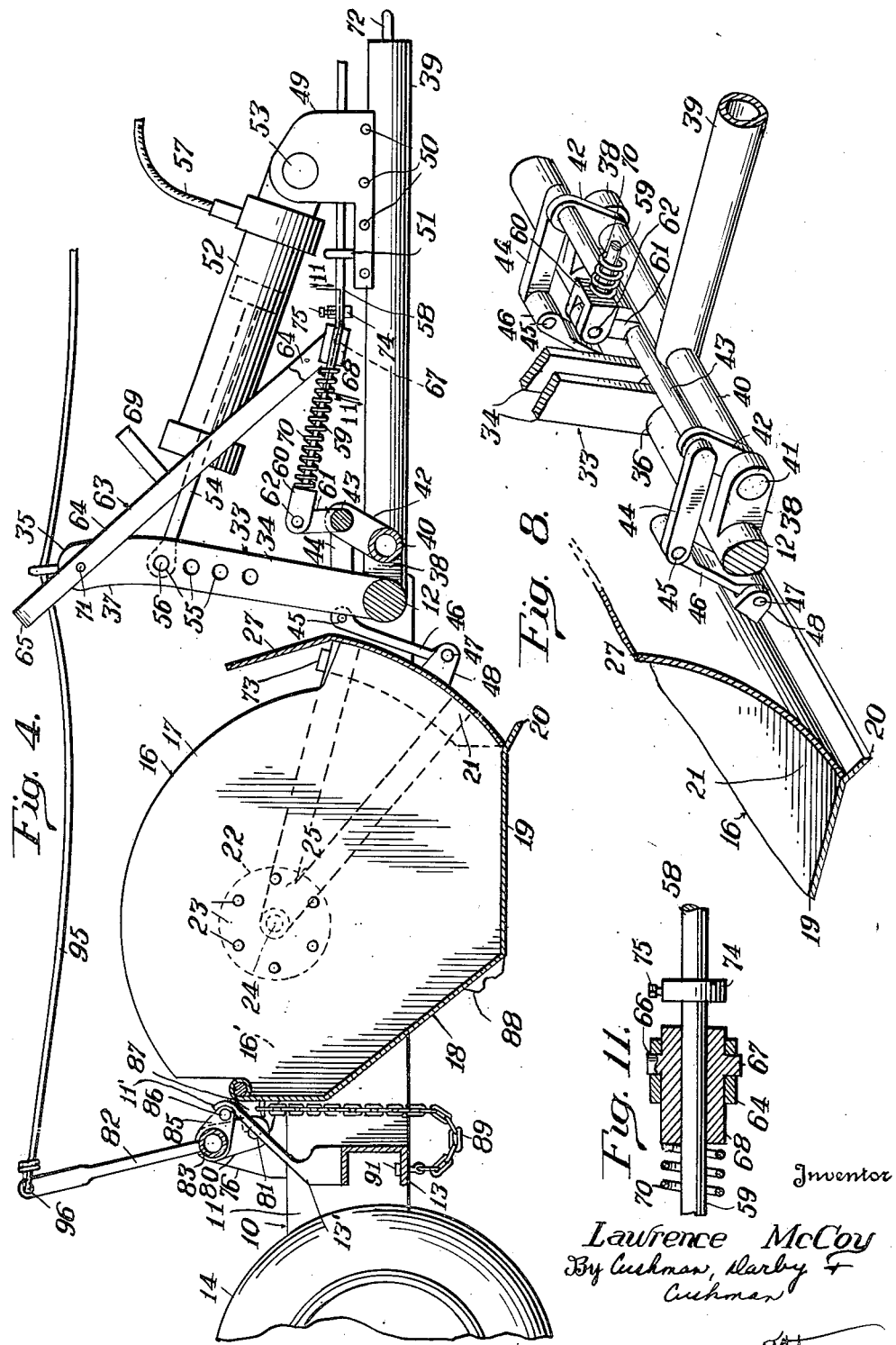

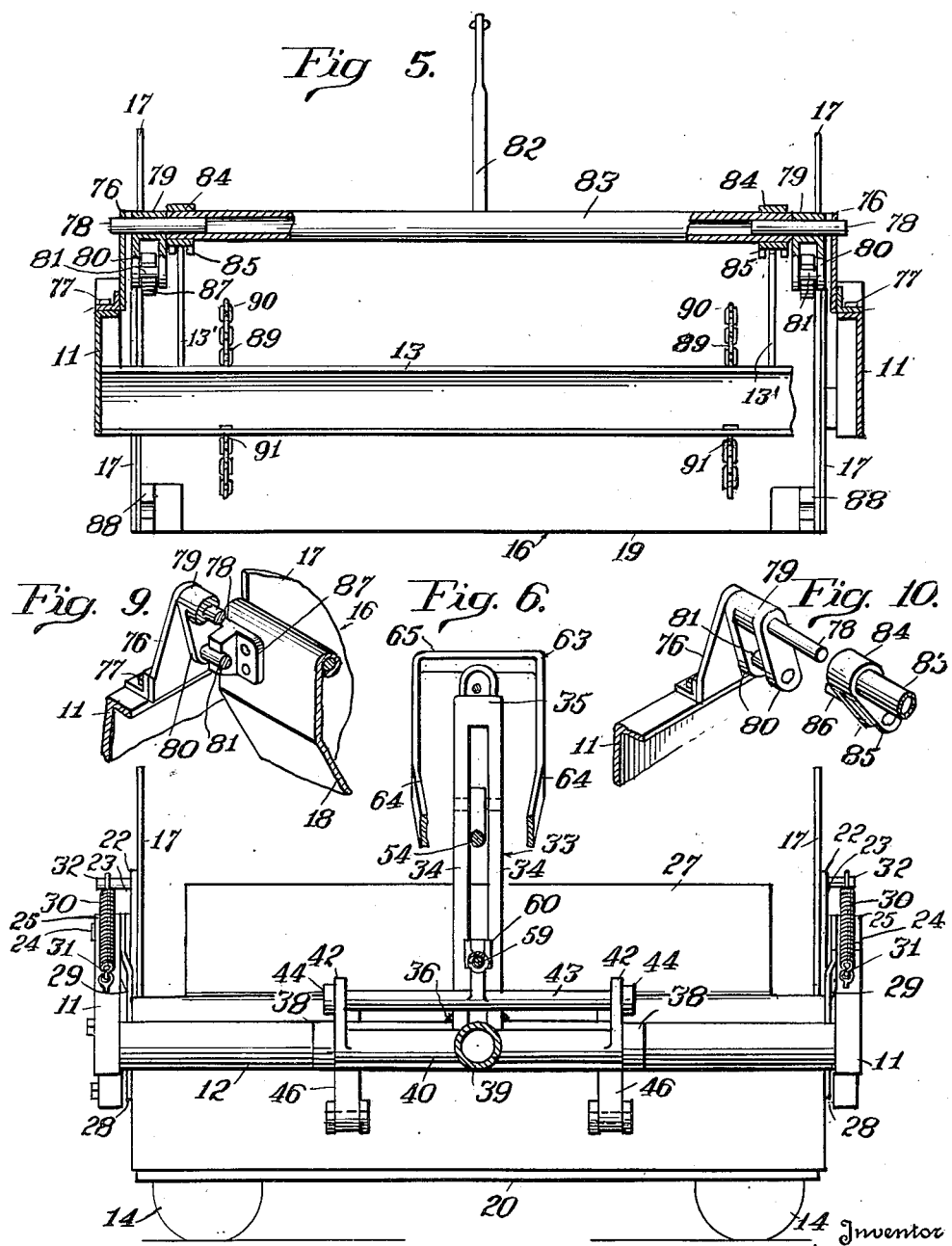

Patented May 20, 1952

2,597,659

UNITED STATES PATENT OFFICE 2,597,659

SCRAPER AND APRON ACTUATING MECHANISM

Lawrence McCoy, Riverton, Wyo.

Application October 21, 1948, Serial No. 55,785

6 Claims. (Cl. 37—129)

The present invention relates to an improved scraper for collecting, transporting, and dumping material.

An important object of the invention consists in providing a scraper having a tiltable frame on which is rotatably mounted a bowl or bucket that normally is maintained in a raised empty position above the ground, and which is arranged to be lowered and maintained in a scraping or loading position and then raised and releasably held in its transporting position, and finally tilted to its dumping position. In order to prevent discharge of the material in the bowl when it is transporting material, a movable gate is provided for closing the bowl. Operatively connected to the bowl and the gate is a fluid motor carried by the scraper for raising or lowering the bowl and for simultaneously moving the gate either to its opened or closed position.

Other objects or advantages of the invention will become apparent from the following description when taken in conjunction with the accompanying claims and drawings.

Referring to the drawings in which are shown preferred embodiments of the invention:

Figure 1 is a side view of the invention applied to a wheeled scraper showing in full lines the bowl and its associated parts in the scraping or loading position and in dotted lines the parts in their carrying or empty position.

Figure 2 is a side view similar to Figure 1 but showing the bowl and its associated parts in their dumping position.

Figure 3 is a plan view of the scraper.

Figure 4 is a sectional view taken substantially along the line 4—4 of Figure 3 and showing the bowl in its empty or carrying position.

Figure 5 is a sectional view taken substantially along the line 5—5 of Figure 3.

Figure 6 is a sectional view taken substantially along the line 6—6 of Figure 1.

Figure 7 is a detail perspective view of the movable gate assembly with parts in section.

Figure 8 is a detail perspective view of the gate and its associated operating parts.

Figure 9 is a detail perspective view of one end of the latch mechanism.

Figure 10 is a view similar to Figure 9 with parts disassembled.

Figure 11 is an enlarged sectional view taken substantially along the line 11—11 of Figure 4.

Figure 12 is a sectional view taken substantially along the line 12—12 of Figure 3, and Figure 13 is a plan view of a modified form of blade which may be detachably connected to the bowl or scoop.

Referring to the drawings in which like numerals indicate like parts in the several views, the main frame of the scraper is designated by the numeral 10, and includes the parallel spaced side members 11 which are connected at their forward ends by a transverse member 12 (Fig. 3), and adjacent but spaced from their rear ends by a transverse channel member 13 (Fig. 4) so as to provide a rigid and strong supporting frame structure. The frame 10 is tiltably supported at its rear end by the wheels 14 which are journalled to the side members 11 through the axles 15 that, as shown, extend inwardly from the side members 11. Obviously, the axles 15 may be arranged to extend outwardly from the side members so that the wheels will be positioned outside of the frame. A scraper bowl or bucket 16 has spaced curved sides or ends 17 (Fig. 4), a rear inclined back 18 and a bottom 19. As shown, the bottom 19 terminates at its forward end in a straight cutting blade 20 so as to be formed with an opened front end 21 (Fig. 8). The bowl 16 may be rotatably or tiltably mounted on the frame through the instrumentality of plates or discs 22 secured to the outer surface of the sides 17 of the bowl by the bolts or rivets 23. Each of the plates 22 has extending outwardly and centrally therefrom a trunnion 24 rotatably mounted in a bearing block 25 secured to the top of the adjacent side member 11 by the bolts 26. A vertically movable curved gate 27 is positioned in front of the scraper bowl 16 to control the discharge of material from the open end 21, and is pivotally connected to the trunnions 24 by the arms 28 and 29 (Fig. 7) which extend rearwardly from opposite ends of the gate. Coil springs 30 are connected at their forward ends as at 31 to the side members 11 (Fig. 3) and at their rear ends to lugs 32 that extend outwardly from the plates or discs 22 on the bowl.

The front transverse member 12 of the frame 10 has centrally extending therefrom an upright 33 which may be formed of two spaced arms or straps 34 connected by a transverse portion 35 at their upper ends (Fig. 6), and which are welded or otherwise secured at their lower ends to the transverse member as at 36. The upper end of the upright 33 has a rearwardly curved portion 37. Extending outwardly from the transverse member 12 and positioned on the outside of the upright 33 are spaced bearing lugs 38. A draft bar or tongue 39 is provided at its rear end with a transverse portion 40 (Fig. 8), the ends 41 of which are rotatably mounted in the lugs 38. On the transverse portion 40 of the tongue 39 are welded or otherwise connected spaced arms 42 having longitudinally aligned openings through which extend a rock shaft 43. The ends of the rock shaft 43 are operatively connected to the gate 27 by a link mechanism comprising the spaced links 44 fixed at their outer ends to the shaft 43 and at their inner ends pivoted as at 45 to depending links 46 pivotally connected at their lower ends as at 47 (Fig. 8) to bifurcated lugs 48 attached to the outer surface of the gate 27. A bracket member 49 is secured as at 50 to the draft bar 39 adjacent the forward end thereof, and carries an upwardly extending eye bolt or guide 51. A fluid pressure cylinder 52 is pivoted at its forward end as at 53 to the member 49, and has an inwardly extending reciprocating piston rod 54 which is arranged to be pivotally connected to the upright 33 in any one of the vertically spaced openings 55 by the releasable pins 56. Fluid under pressure, such as oil, is introduced and discharged from the cylinder 52 through a flexible pipe 57 under the control of the tractor operator. A longitudinally slidable rod or member 58 (Fig. 4) extends through the guide bolt 51 and has a bent or upwardly inclined rear portion 59 that terminates in an enlarged bifurcated head 60 which is pivotally connected to an arm or lug 61 (Fig. 8) on the rock shaft 40 by a pin 62. An inclined member 63, preferably in the form of a rigid strap, has spaced sides 64 connected at their upper ends by a transverse portion 65 (Fig. 6), and is provided adjacent their lower ends with aligned openings 66 (Fig. 11) through which extend the trunnions 67 of a sleeve member 68 slidably mounted on the inclined portion 59 of the rod 58. The spaced sides 64 of the member 63 intermediate their ends may be connected by a U-shaped brace member 69. A coil spring 70 surrounds the inclined portion 59 of the rod 58, and is confined between the head 62 and the sleeve 68 so as normally to urge the rod outwardly and towards the tractor. The upper end of the member 63 is pivotally connected as at 71 to the upright 33 to provide an operative connection of the piston rod 54 through the upright 33, rock shaft 43, and the link mechanism, with the gate 27. The outer end of the draft bar or tongue 39 may have a clevis 72 for detachably connecting the wheeled scraper to a tractor or the like. The upper end portions of the gate 27 (Fig. 7) may be provided with outwardly extending lugs 73 arranged to overlap and engage the top of the side members 11 so as to limit the downward movement of the gate. A stop collar 74 (Fig. 11) is slidably mounted on the rod 58 and is maintained in a fixed position by the set screw 75 to control the outward movement of the sleeve 68.

To the top of the side frame 11, adjacent the rear ends thereof, are secured transversely aligned brackets 76 by the bolts 77 (Fig. 9). Each of the brackets 76 has welded or otherwise secured thereto an inwardly extending short shaft 78 on which is loosely mounted a dog or latch 79 having a pair of spaced depending arms 80 connected by a transverse pin 81 (Fig. 10). A trip lever 82 (Fig. 5) is connected centrally to a transverse tubular member 83 and is positioned so that the shafts 78 extend into the ends of the tubular member 83, so that the latter is rotatably mounted thereon and abuts the adjacent sides of the dogs 79 when the parts are set up. The ends of the tubular member 83 have fixed thereon collars 84 having depending arms 85 from which extend laterally and outwardly therefrom lugs 86 positioned in front of the dogs 79, so that upon rotation of the tubular member 83 by the trip lever 82, the lugs 86 engage the dogs 79 and move them rearwardly or away from the scraper bowl 16. Spaced upwardly inclined hooked arms 13' connected to the transverse member 13 (Fig. 3) are positioned in the path of the arms 85 (Fig. 12) to limit the forward movement thereof.

Extending outwardly from the rear of the bowl 16 are a pair of spaced fixed catch members 87 arranged to be engaged by the dogs 79 when the scraper and bowl are in their empty or carrying position (Fig. 4), and which also locks the bowl 16 to the frame 10 when the latter is tilted or moved about the axles 15. The back of the bowl 16 is also provided with a pair of catch members 88 which engage the dogs 79 when the scraper is moved to its dumping position (Fig. 2). In order to limit the rotation of the scraper bowl 16, when moved to its dumping position, spaced flexible members such as chains 89 are each connected at one end as at 90 to the back of the bowl and at its opposite end to the cross member 13 as at 91 (Fig. 4). Coil springs 92 (Fig. 3) are connected at their rear ends to the dogs 79 as at 93, and at their forward ends to the top of the side frames 11 as at 94 (Fig. 2), so as normally to urge the dogs forwardly toward the bowl 16 in order to engage the catch members 87 and 88 when the latter are moved into alignment therewith upon rotation or tilting of the bowl 16. A flexible member 95 is connected to the upper end of the trip lever 82 as at 96 and extends forwardly to a point adjacent the operator's seat of the tractor so as to be conveniently manipulated. The fluid supply and discharge pipe 57 connected to the cylinder 52 also extends forwardly to a point adjacent the seat of the operator so that he may control the flow of the pressure fluid into and out of the cylinder 52 in order to raise or lower the frame 10, bowl 16, and gate 27.

The cutter blade 20, instead of being formed integral with the bottom 19 of the bowl, may, if desired, be made of a separate piece 97 (Fig. 13) having either a curved cutting edge 98 or a straight cutting edge. The blade 97 may be provided with spaced openings 99 which register with complementary formed openings in the edge of the bottom 19 so as to be removably secured thereto by retaining bolts or the like, not shown.

In operation, the wheeled scraper is connected through the clevis 72 to a tractor or the like, and the frame 10 and the bowl 16 are normally maintained in an empty or carrying position, as shown in Figure 4, by engagement of the dogs 79 with the catch members 87 on the rear of the bowl 16. At the same time, the oil or fluid pressure now in the cylinder 52 has moved the piston rod 54 rearwardly so as to raise and maintain the frame 10 and the bowl 16 above the ground, and the gate 27 to its closed position. When it is desired to move the bucket 16 to its scraping or loading position, the operator releases the fluid from the cylinder 52 which causes the piston rod 54 and the upright 33 and the forward end of the frame 10 to swing downwardly so that the bowl may be loaded with dirt upon the forward movement of the tractor. The upright 33 is also moved forwardly, pushing on arms 64 which in turn force the slidable sleeve 68 into abutting engagement with the stop collar 74, as shown in full lines in Figure 1, so as to move the arms 64 outwardly and rotate the rock shaft 43, which in turn raises the link mechanism 44 and 46 connected to the gate to raise the latter in order to allow the dirt to be moved into the bowl.

As the scraper starts to dig a load it pulls down on the tractor, and this pull is so low that the tractor is prevented from raising up at the front end thereof.

When the bowl is filled or when it is desired to discontinue the loading of the bowl, the operator introduces fluid under pressure into the cylinder 52 through the pipe 57 which moves the piston rod 54 rearwardly and pushes the upright 33 so as to raise or return the frame 10 and the bowl 16 to their carrying or transporting position. Simultaneously, the arms 64 are pulled backwardly about their pivot 71 forcing shaft 58 to also move rearwardly, thus moving the link mechanism downwardly to close the gate 27 relative to the opened end 21 of the bowl (Fig. 4). If the frame and bucket 16 are raised higher than their normal horizontal position by the rearward movement of the piston 54, the spring 70 is compressed by the inwardly slidable movement of the sleeve 68. However, it will be seen that the spring 70 does not start to compress until after the gate 27 is closed or if the gate should hit something hard during the closing operation which prevents it from closing. To one or each of the sides 17 of the bowl may be connected a lug 16' (Fig. 2) positioned to abut the frame 11 and provide a stop when the bowl is released from its dumping position and returned to its carrying or loading position. While a single way cylinder 52 is shown for operating the arms 34 and their associated parts, and requires the use of only one supply pipe so that gravity and the weight of the bowl or bucket 16 functions to return it to its carrying or loading position, it will be manifest that a two-way cylinder might also be used for operating these parts.

The bucket in its loading position is carried from 4 to 8 inches above the ground and when the operator is ready to dump the load, a slight pull on the flexible member or rope 95 moves the tripping lever 82 forwardly and rotates the tubular member 83 clockwise so that the lugs 86 thereon, which overlap the depending arms 80 of the dog 79, causes the latter to move rearwardly and out of engagement with the catch members 87. The catch members 88 are now moved into registration with the dog 79 to maintain the bowl in a fixed position during the dumping operation and until released by the movement of the trip lever 82. The bowl 16 is so balanced on its pivotal connection with the side members 11 that it will dump or discharge by gravity through the assistance of the tension of the springs 30 which are expanded when the scraper is in its load-carrying position. It might be mentioned that the bowl 16 may be raised by the piston rod 54 so as to spread the dirt along the ground to a depth of about 14 inches. When the flexible member 95 is actuated to trip the lever 83 in order to dump the contents of the bowl, the springs 30 with the assistance of gravity, will assist in this operation. As the dirt is being discharged, it keeps pushing or rotating the bowl 16 until the tripping dogs 79 engage the bottom catches 88 which then positively hold the bowl in its dumped position. It might be mentioned that in this dumped position, the bowl is very back heavy due to the fact that it is constructed of heavy gauge metal in order that it may wear longer and so that it will function to create a rearward rotary swing of the bowl when the trip lever is pulled to return the bowl to its carrying or loading position. The bowl has a very hard rearward swing that is cushioned by the springs 30 which prevent the bowl from returning to its loading or carrying position too quickly and which it would do were it not for springs 30, due to the heavy bottom 19 overbalancing the bucket rearwardly when the bucket is unloaded.

When the bucket 16 is unloaded, the operator trips the lever 82 which causes release of the dogs 79 with the catch members 88, and the bucket then returns to its empty position (Fig. 4) so that the catch members 87 will now be engaged by the dogs 79 in order that the reloading of the bucket may take place upon releasing the oil in the cylinder 52, so as to allow the forward end of the frame to swing about the axis of the wheels 14 in order to move the bucket into scraping engagement with the ground for reloading.

Thus, it will be seen that simple, efficient and positive means are provided for simultaneously raising the gate 27 when the bowl or scoop 16 is moved from its normal carrying position to its inclined scraping or loading position. Conversely, when the bowl is raised to its carrying position, the gate 27 is lowered to close the forward end thereof, thus insuring efficient operation of the scraper. By reason of the detachable blade, such as shown in Figure 13, these blades may be readily removed to be sharpened or replaced by new blades at a minimum expenditure of time and effort. The piston rod 54 may be adjustably connected to the upright 33 through the vertical spaced openings 55, so as to vary the length of stroke of the piston rod and the arcuate movement of the upright as the best working conditions may require.

It is to be understood that the forms of the invention shown and described are merely illustrative of preferred embodiments, and that such changes may be made as fall within the purview of one skilled in the art without departing from the spirit of the invention and the scope of the following claims.

I claim:

1. In a scraper, a tiltable frame having spaced side members and a transverse front member, wheels journalled on the rear of the side members, a scraper bowl pivotally mounted on the side members, said bowl having an opened front end and a scraper blade extending outwardly from the bottom thereof, a vertically movable gate pivotally mounted on the side members for closing the front end of the bowl, a longitudinally extending draft bar pivotally connected at its rear end to said transverse member and having a front free end arranged to be connected to a vehicle, said transverse member having an elongated upright extending substantially centrally therefrom and positioned to the rear of said transverse member, a fluid motor pivotally connected at its front end to said draft bar, said motor having a rearwardly and upwardly extending reciprocating piston rod pivotally connected to said upright for raising and lowering the forward end of the frame and the bowl, a rock shaft mounted on said front transverse member, means operatively connecting said shaft to said upright, and means operatively connecting said shaft to said gate, the parts being constructed and arranged so that movement of the piston rod controls the movement of the bowl and the gate.

2. In a scraper, a tiltable frame having spaced side members and a transverse front member, wheels journalled on the rear of the side members, a scraper bowl pivotally mounted on the side members, said bowl having an opened front end and a scraper blade extending outwardly from the bottom thereof, a vertically movable gate pivotally mounted on the side members for closing the front end of the bowl, a longitudinally extending draft bar pivotally connected at its rear end to said transverse member and having a front free end arranged to be connected to a vehicle, said transverse member having an elongated upright extending substantially centrally therefrom, a fluid motor pivotally connected at its front end to said draft bar, said motor having a rearwardly and upwardly extending reciprocating piston rod pivotally connected to said upright for raising and lowering the forward end of the frame and the bowl, a rock shaft rotatably mounted on said front transverse member, a linkage mechanism operatively connecting the rock shaft to said gate, and means operatively connecting said rock shaft to said upright so that movement of the upright by said motor simultaneously actuates the gate.

3. In a scraper, a tiltable frame having spaced side members and a transverse front member, wheels journalled on the rear of the side members, a scraper bowl pivotally mounted on the side members, said bowl having an opened front end and a scraper blade extending outwardly from the bottom thereof, a vertically movable gate pivotally mounted on the side members for closing the front end of the bowl, a longitudinally disposed draft bar pivotally connected at its rear end to said transverse member, said transverse member having an upright extending substantially centrally therefrom, a fluid motor pivotally connected at its front end to said draft bar, said motor having a rearwardly extending reciprocating piston rod pivotally connected to said upright for raising and lowering the forward end of the frame and the bowl, a rock shaft rotatably mounted on said front transverse member, a linkage mechanism operatively connecting said rock shaft to said gate, a longitudinally movable rod slidably mounted on said draft bar and operatively connected to said rock shaft, and means operatively connecting said rod to said upright so that movement of the latter by the motor simultaneously actuates the rock shaft to move the gate.

4. In a scraper, a tiltable frame having spaced side members and a transverse front member, wheels journalled on the rear of the side members, a scraper bowl pivotally mounted on the side members, said bowl having an opened front end and a scraper blade extending outwardly from the bottom thereof, a vertically movable gate pivotally mounted on the side members for closing the front end of the bowl, a longitudinally disposed draft bar pivotally connected at its rear end to said transverse member, said transverse member having an upright extending substantially centrally therefrom, a fluid motor pivotally connected at its front end to said draft bar, said motor having a rearwardly extending reciprocating piston rod pivotally connected to said upright for raising and lowering the forward end of the frame and the bowl, a rock shaft mounted on said front transverse member, means operatively connecting said shaft to said gate, a longitudinally movable rod slidably mounted on said draft bar and operatively connected to said rock shaft, an inclined member pivotally connected at its upper end to said upright, means slidably connecting the lower end of said inclined member to said rod, and means for limiting the outward sliding movement of said inclined member on said rod, the parts being constructed and arranged so that when the frame and bowl are in their carrying position and are tilted downwardly by the operation of the motor, the gate is simultaneously raised and conversely, when the frame and bowl are returned by the motor to their carrying position, the gate is simultaneously moved to close the forward end of the bowl.

5. In a wheeled scraper, a tiltable frame, a scraper bowl pivotally mounted on the frame and having an opened front end, a gate pivotally mounted on the frame for closing the front end of the bowl, a longitudinally disposed draft bar pivotally connected at its rear end to said frame, said frame having an upright extending substantially centrally from the front end thereof, a fluid motor mounted on the draft bar and having a rearwardly extending reciprocating piston rod, means adjustably connecting the piston rod to the upright, a rock shaft mounted on the front of the frame, means operatively connecting said rock shaft to said gate, a longitudinally movable rod slidably mounted on said draft bar and operatively connected to said rock shaft, an inclined member pivotally connected at its upper end to said upright, means slidably connecting the lower end of said inclined member to said rod, means for limiting the outward slidable movement of said inclined member on said rod, and yieldable means on said rod and confined between the rear end of the rod and said upright for normally urging said rod outwardly relative to the frame, the parts being constructed and arranged so that when the frame and bowl are in their carrying position and are tilted downwardly by the operation of the motor, the gate is simultaneously raised away from the opening in the bowl and conversely when the frame and bowl are returned by the motor to their carrying position, the gate is simultaneously moved to close the forward end of the bowl.

6. In a wheeled scraper, a tiltable frame, a scraper bowl pivotally mounted on the frame and having an opened front end, a gate pivotally mounted on the frame for closing the front end of the bowl, a draft bar pivotally connected at its rear end to said frame, said frame having an upright extending substantially centrally from the front end thereof, a fluid motor mounted on the draft bar and having a rearwardly extending reciprocating piston rod, means adjustably connecting the piston rod to the upright, a rock shaft mounted on the front of the frame, means operatively connecting said rock shaft to said gate, a longitudinally movable rod slidably mounted on said draft bar and operatively connected to said rock shaft, an inclined member pivotally connected at its upper end to said upright, means slidably connecting the lower end of said inclined member to said rod, means for limiting the outward slidable movement of said inclined member on said rod, yieldable means on said rod and confined between the rear end of the rod and said upright for normally urging said rod outwardly relative to the frame, the parts being constructed and arranged so that when the frame and bowl are in their carrying position and are tilted downwardly by the operation of the motor, the gate is simultaneously raised away from the opening in the bowl and conversely when the frame and bowl are returned by the motor to their carrying position, the gate is simultaneously moved to close the forward end of the bowl, said bowl being provided with circumferentially spaced catch means, a latch mechanism pivotally mounted on the frame adjacent the rear of the bowl and arranged to engage the catch means when the latter is moved into alignment therewith to maintain the bowl in a fixed position, and means operatively connected to the latch mechanism for releasing the same.

LAWRENCE McCOY.

REFERENCES CITED

The following references are of record in the file of this patent:

UNITED STATES PATENTS

| Number | Name | Date |
|---|---|---|
| 2,015,880 | Wold | Oct. 1, 1935 |
| 2,096,656 | Stoulil | Oct. 19, 1937 |
| 2,168,318 | Broderson et al. | Aug. 8, 1939 |
| 2,180,658 | Austin | Nov. 21, 1939 |
| 2,257,761 | Paulsen | Oct. 7, 1941 |
| 2,297,938 | Briscoe | Oct. 6, 1942 |
| 2,386,192 | Brimhall | Oct. 9, 1945 |
| 2,445,260 | Brimhall | July 13, 1948 |